Aug. 9, 1955 A. DONSKY ET AL 2,714,818
DEW POINT INDICATOR
Filed Jan. 27, 1953 2 Sheets-Sheet 1

INVENTOR.
ABRAHAM DONSKY
HENRY NAUBEREIT
MORRIS PAULOVICH
BY
ATTORNEYS

Aug. 9, 1955 A. DONSKY ET AL 2,714,818
DEW POINT INDICATOR
Filed Jan. 27, 1953 2 Sheets-Sheet 2
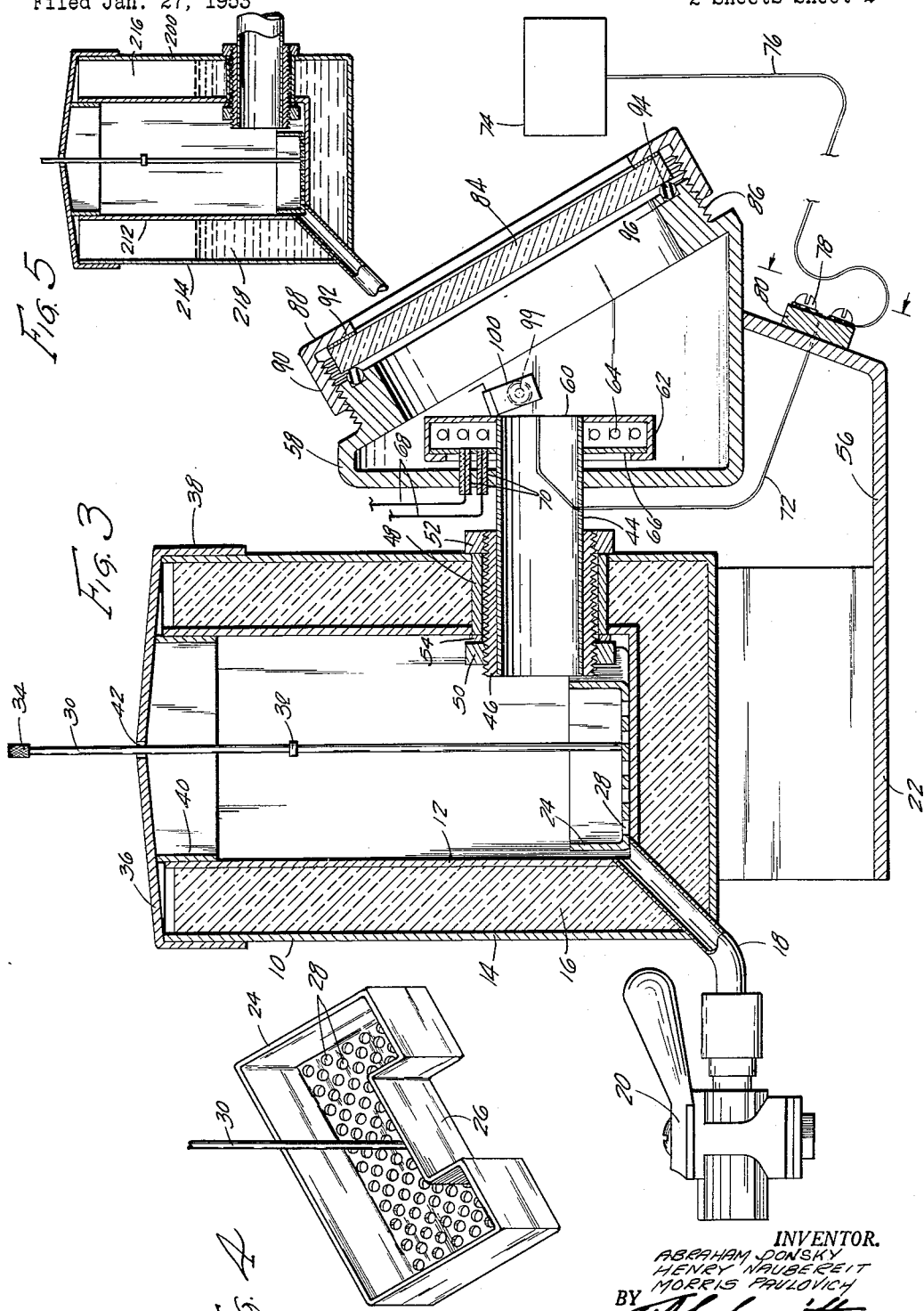
INVENTOR.
ABRAHAM DONSKY
HENRY NAUBEREIT
MORRIS PAULOVICH
BY
ATTORNEYS

2,714,818
DEW POINT INDICATOR

Abraham Donsky, Philadelphia, Pa., Henry Naubereit, Maple Shade, N. J., and Morris Paulovich, Malvern, Pa.

Application January 27, 1953, Serial No. 333,627

4 Claims. (Cl. 73—17)

(Granted under Title 35, U. S. Code (1952), sec. 266)

The invention described herein may be manufactured and used by or for the Government of the United States of America for governmental purposes without the payment of any royalties thereon or therefor.

This invention relates to an improved testing instrument for indicating the dew point temperature or humidity of a gas, and particularly relates to such an instrument which is accurate over wide temperature and pressure ranges.

The equipment utilized heretofore for ascertaining dew point temperature operated in narrow pressure and temperature ranges were not overly accurate, were comparatively complex and costly, were difficult to calibrate, and required prolonged experience in their use in order to operate them to the best advantage.

It is, therefore, one object of this invention to provide a dew point indicator which is capable of accurately operating over wide temperature and pressure ranges.

Another object of this invention is to provide a dew point indicator which allows an improved visible determination of the exact temperature at which condensation takes place.

Another object of this invention is to provide a dew point indicator which is relatively simple in construction and inexpensive to manufacture.

Another object of this invention is to provide a dew point indicator which is easy to operate.

Other objects and many of the attendant advantages of this invention will be readily appreciated as the same becomes better understood by reference to the following detailed description when considered in connection with the accompanying drawings wherein:

Fig. 3 is a side view partly in section and partly in elevation of the dew point indicator.

Fig. 4 is a perspective view of the ice tray.

Fig. 5 is a sectional view of a modified form of refrigerant case.

Figure 1:
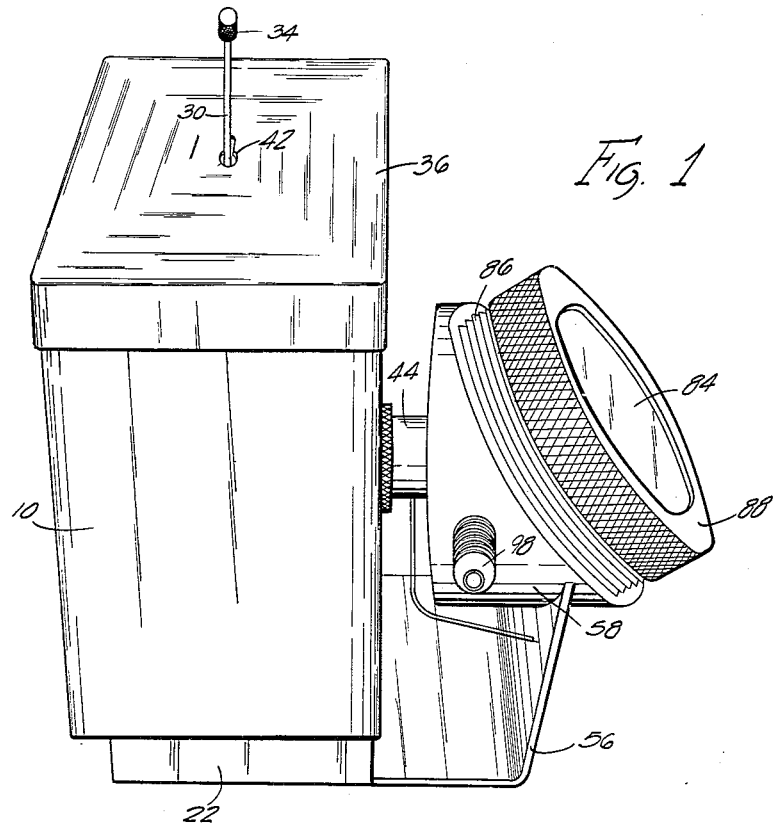
Fig. 1 is a top perspective view of an embodiment of the invention.
Figure 2:
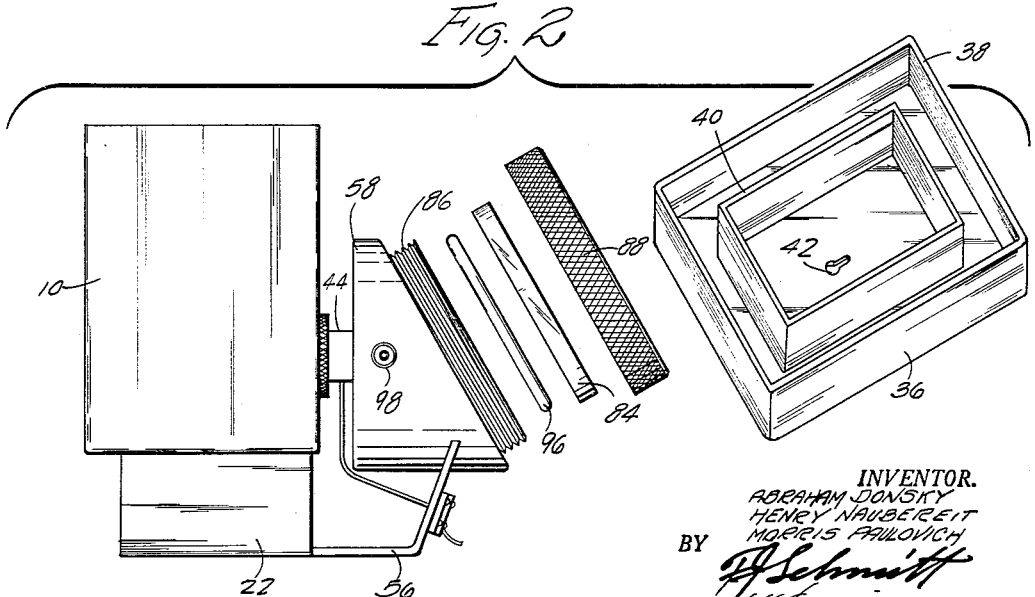
Fig. 2 is an exploded view of the dew point indicator shown in Fig. 1.

Referring now in greater detail to the drawings wherein similar reference characters refer to similar parts, there is shown a portable indicating unit in which there is provided a refrigerant case 10 comprising an inner container 12 having an open top and an outer container 14 also provided with an open top. The two containers are spaced from each other by heat insulating material 16 which may take various forms such as fibre glass, porcelain, asbestos, cork or the like. A drain pipe 18 extends from the inner container 12 and is provided with a conventional stop-cock 20. A hollow base 22 supports the refrigerant case.

Within the case 10 is provided an insertable tray 24 for holding Dry Ice or the like. This tray 24 is generally rectangular in shape to fit the rectangular dimensions of the inner container 12 and is provided with a recessed portion 26 to allow the tray to clear the end of the refrigerant tube to be later described. A plurality of holes 28 are provided in the bottom of the tray to allow for drainage. A slightly flexible stem 30 is connected at one end to the bottom of the tray and is provided intermediate its ends with a flange 32. A knurled handle 34 is provided at the free end of the stem. The tray prevents the ice from obstructing the drainage of the coolant and thereby expedites the effectiveness of the heater, to be later described, at those times when it is desired to heat the deposit surface relatively quickly. The tray also helps to conserve ice during non-reading periods and to reduce frosting of exterior surfaces.

A lid 36 is provided for the case 10 and this lid is equipped with a pair of spaced, concentric annular flanges, the outer flange 38 being adapted to embrace the outer periphery of the case and the inner flange 40 being adapted to closely fit within its inner periphery. The inner flange 40 not only acts in conjunction with the outer flange to seat the lid on the case but also acts as a baffle to prevent any liquid coolant from splashing over the edge of the case and seeping out from under the lid. This is of importance since the coolant generally used comprises a combination of Dry Ice carried in the tray and liquid acetone which surrounds the Dry Ice. A key-hole 42 in the center of the lid is adapted to receive the stem 30 in sliding relationship. If it is desired to support the tray at an elevated position within the case, the stem 30 is pulled through the key-hole until the flange 32, which is of slightly less diameter than the enlarged portion of the key-hole, passes through. The slightly flexible stem is then pulled over until the flange 32 overlies the smaller portion of the key-hole, at which time the tray is locked in elevated position. By locking the tray at an elevated position, the heater is enabled to work faster when it is desired to raise the temperature of the deposit surface, as will be more fully described subsequently.

A horizontal refrigerant tube 44 opens into the lower portion of the refrigerant case 10, this tube being held in position by an externally threaded sleeve 46 which is held in an opening in one side of the case by a spacer bushing 48 and a pair of nuts 50 and 52. A sealing gasket 54 is provided between the nut 50 and the bushing 48.

Extending from the base 22 is a support 56 upon which is mounted a housing 58. The tube 44 extends through an opening in the housing 58 and is sealed at that end which projects into the housing 58 by a thin metallic disc or diaphragm 60 of circular shape which is chrome plated on the outside to provide a mirror-like finish. The diaphragm 60 is approximately twice the diameter of the end of the tube 44 and the outer marginal portion of the diaphragm for half its radius overlies the front side of a ring shaped housing 62 which encloses heating coils 64. The rear portion of the housing 62 is open to allow insertion and removal of the coils, but is adapted to be closed by a removable sealing plate 66. Heater leads 68 extend through insulated tubes 70 and connect the heating coils to a source of electrical energy, not shown.

It is, therefore, seen that, for contrast purposes, the central portion of the diaphragm deposit surface overlies the end of the tube 44 which is in direct contact with the coolant within the case 10, while the outer marginal portion of the deposit surface overlies the front wall of the ring forming part of the heater housing 62. As a result, when condensation occurs, it appears on the central portion of the diaphragm surface and can be detected readily by contrast with the lack of moisture on the outer margin of the diaphragm surface. Such aid to detection is very important in determining the temperature at which the condensation takes place.

A metal-sheathed coaxial thermocouple 72 is soldered at one end to the center of the back side of the deposit surface. This thermocouple forms part of a potentiometer bridge circuit preferably of the self-balancing type.

The thermocouple 72 is connected to a potentiometer type of temperature reading meter 74 by a similar thermocouple type of cable 76 which is connected to the thermocouple 72 by the binding screws 78 on a terminal block 80 attached to the front of the upstanding portion of support 56. The meter 74 is a conventional thermocouple potentiometer type of temperature meter and has, therefore, not been illustrated in detail since in forms no part of the invention by itself.

An important feature of the invention that should be noted at this time concerns the fabrication of the diaphragm and its connection to the thermocouple 72. The thermocouple is soldered to the diaphragm or disc 60 and the disc is, thereafter, machined down to the desired thinness. If the reverse procedure were to be used, the thin disc would warp under the heat of soldering, or the heat would otherwise affect the smooth appearance of the deposit surface.

The outer end of the tube 44 including the contrast and deposit diaphragm surface 60 and the heater 62 are located within the chamber formed by the housing 58. The surface of the diaphragm 60 is visible to the outside through a glass member 84 held in place on an externally threaded flange 86 by a ring member 88 provided with an internally threaded flange 90, the threads on flange 90 mating with the threads on flange 86. A gasket 92 is arranged between the glass 84 and the ring 88 while a resilient O-ring 94 is provided between the glass 84 and the flange 86, a recess 96 being provided in the top of the flange 86 to receive the O-ring.

Air inlet and outlet fittings are provided on the housing 58, each of these fittings being opposite the other. Both fittings are alike and are in the form of externally threaded hose connections, one of these fittings being shown at 98, this being the outlet fitting. An air flow indicator and diffuser in the form of a flapper 100 is provided within the housing chamber overlying the inner end of the inlet fitting 99. This flapper 100, which is hinged to the housing, serves to indicate the flow of air as well as to diffuse it within the chamber.

In operation, the air or other gas is admitted into the chamber formed by housing 58 through the inlet fitting 99, and diffused within the chamber by flapper 100. The air then passes across the cooled disc 60 and leaves the chamber through fitting 98. The disc is observed carefully and if condensation occurs it will cover the central portion of the disc which is exposed directly to the coolant. The contrast furnished by the central and marginal portions of the disc enables the observer to more readily detect when condensation occurs. If uncertainty persists regarding the presence of condensation, the Dry Ice tray 24 may be lifted and locked at a higher level by means of the locking means heretofore described, after which the heater 62 is energized. If condensation is present, the heat will change the deposit to a more readily visible form.

By alternately cooling and heating the contrast and deposit surface the condensation will be caused to grow from a small area to an increasingly larger circular area and to be eventually reduced from that larger area to a vanishing point. This is of considerable advantage in the detection of the condensation and in the accurate determination of the temperature when the condensation occurs.

In Fig. 5 there is shown a modification of the invention wherein a refrigerant case 200 similar to case 10 is provided but wherein the inner container 212 and the outer container 214 provide a chamber 216 therebetween which is adapted to contain a liquid coolant such as liquid air 218. Common spacing ribs, not shown, keep the containers spaced from each other.

By varying the amount of liquid air in the chamber 216, the temperature on the diaphragm can be varied within the limits existing between the temperature of the Dry Ice and acetone and the temperature of the liquid air. This provides a substantially fine control over the temperature at the center of the diaphragm.

Obviously many modifications and variations of the present invention are possible in the light of the above teachings. It is, therefore, to be understood that within the scope of the appended claims the invention may be practiced otherwise than as specifically described.

What is claimed as the invention is:

1. A dew point indicator comprising a casing having a chamber therein for holding refrigerant material, a substantially flat diagram connected to said casing, a first portion of one face of said diaphragm being in fluid communication with said chamber and a second portion of said one face of said diaphragm being blocked from fluid communication with said chamber, and a heating means connected to said casing, said heating means being positioned adjacent said second portion of said one face of said diaphragm and remote from said first portion of said one face of said diaphragm.

2. The device of claim 1 wherein said first portion of said one face of said diaphragm comprises the central portion thereof and wherein said second portion of said one face of said diaphragm comprises the marginal portion thereof.

3. The device of claim 1 wherein said diaphragm and said heating means are positioned within a housing having means therein for observing said diaphragm and wherein means are provided for allowing a gas to enter and leave said housing.

4. A dew point indicator comprising a casing having a chamber therein for holding refrigerant material, a substantially flat diaphragm connected to said casing, a first portion of one face of said diaphragm being in fluid communication with said chamber, a heating means connected to said casing adjacent a second portion of said one face of said diaphragm, and a thermocouple connected to said first portion of said one face of said diaphragm, said thermocouple being connected to a means for indicating the temperature at that portion of said diaphragm to which said thermocouple is connected.

References Cited in the file of this patent
UNITED STATES PATENTS

| | | |
|---|---|---|
| 561,921 | Sutthoff | June 9, 1896 |
| 612,926 | Harris | Oct. 25, 1898 |
| 2,466,696 | Friswold | Apr. 12, 1949 |
| 2,624,195 | Van Alen | Jan. 6, 1953 |